Oct. 18, 1955     E. H. BICKLEY     2,720,707
MEAT BAKING TIME UTENSIL
Filed Feb. 11, 1952
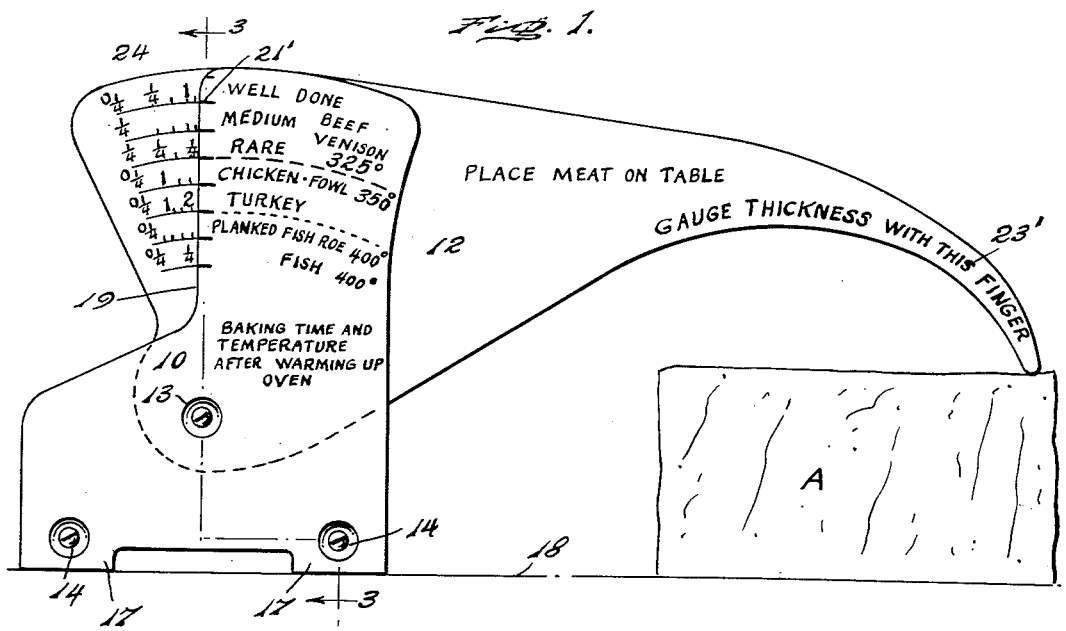
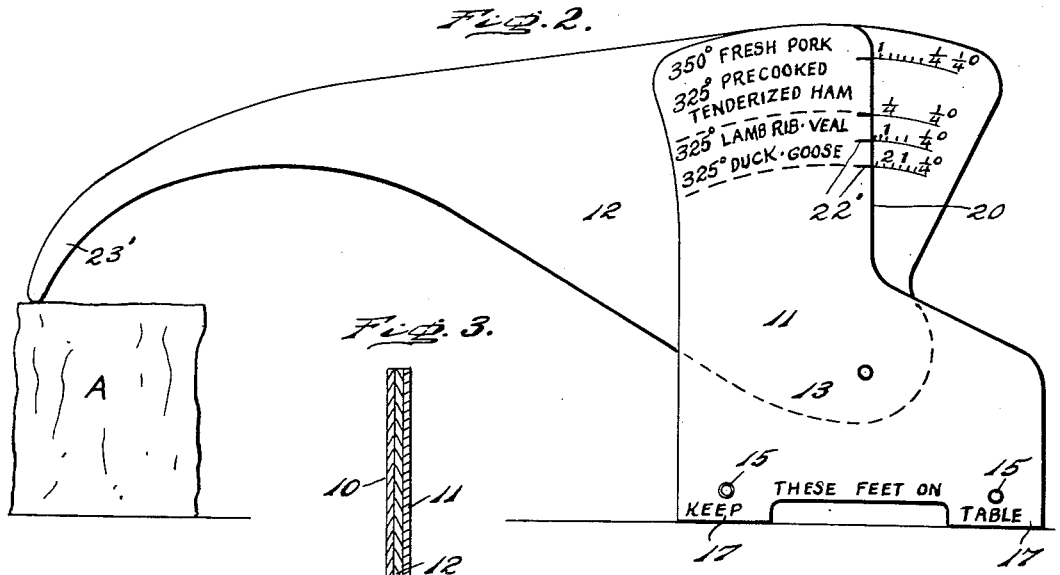
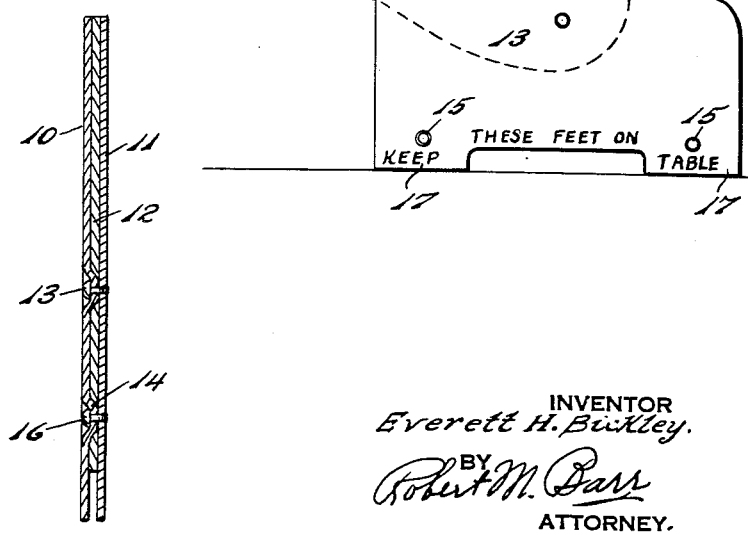
INVENTOR
Everett H. Bickley.
BY
Robert M. Barr
ATTORNEY.

United States Patent Office 2,720,707
Patented Oct. 18, 1955

2,720,707

MEAT BAKING TIME UTENSIL

Everett H. Bickley, Narberth, Pa.

Application February 11, 1952, Serial No. 270,986

1 Claim. (Cl. 33—169)

The present invention relates to the art of cooking and more particularly to a utensil for forecasting the time and temperature in the baking of meats, so that the cook can accurately preset the time and temperature controls on gas, electric or other cooking ranges. The invention further relates to the subject matter of applicant's co-pending application, Ser. No. 173,346, filed July 12, 1950, now abandoned, in that it is a continuation-in-part of such application.

In timing the baking of meats as heretofore practiced, there are three different ways in general use, all of which are more or less specifically related to guesswork. The first and most common is the "hit or miss" method which consists of baking for a while and then sticking a fork into the meat to see if it is done, or cutting it open and looking inside. A method manifestly uncertain and unscientific on account of the variation of the thickness, shape, and density of meats, and range of temperatures which may be encountered.

The second method is based on the weight of a piece of meat. This is the commonest method now in use and the cookbooks supply a time range per pound for cooking various kinds of meats. This method is only approximate and often misleading because the shape of the meat greatly affects the length of time required to cook it properly. For instance, a five pound roast that is thin will cook in much less time than a thick five pound roast. The longest time is when a roast nearly approaches a sphere in shape, and the shortest time is when the roast approaches a flat slab in shape. The shortcomings of the book poundage method are that large roasts are usually under-done and the small roasts are over-done.

The third method is to push a specially constructed oven thermometer into the center of the meat and put the meat in the oven. The oven door is then opened periodically and the thermometer is inspected to see when the temperature reaches a definite degree, usually about 170 to 190 degrees. This method has the objection that the periodic opening of the oven door results in a great loss of heat within the oven and one obviously cannot determine in advance what time to start the roast cooking to have it done properly at the time desired to serve the meal.

Some of the objects of the present invention are to provide a novel device by means of which the time and temperature required for properly baking all kinds of meat can be accurately forecast by a measurement of the thickness of the meat; to provide a device for measuring a selected dimension of a piece of meat and indicating the baking time for that particular meat as a function of such measured dimension; to provide a device for cooking purposes comprising two body parts relatively movable for displacement as a measure of the thickness of a piece of meat, one of such parts having tabularly disposed rows of different meats, with indicated cooking temperatures and the other of such parts having tabularly disposed rows of baking times, said two sets of rows being so interrelated that for any selected meat the baking time is indicated as a function of the measured thickness of that meat; to provide a cooking utensil by means of which the thickness of a piece of meat can be measured at any selected location while the meat is resting on a support, and from such measurement means coact to indicate the correct baking time of the particular meat; and to provide other improvements as will hereinafter appear.

In the accompanying drawing, Fig. 1 is a front view of a utensil for indicating the baking time for meats as a function of meat thickness, the parts being shown as set for a meat thickness measurement; Fig. 2 is a rear view of the same; and Fig. 3 represents a section on line 3—3 of Fig. 1.

Referring to the drawings, one form of the present invention comprises two relatively thin reference plates 10 and 11 for association with a relatively thin sensing member 12, which latter is pivotally mounted between the two like plates 10 and 11, through the medium of a friction spring pivot 13. As a means of fastening the two reference plates together, one plate is formed with two apertures, provided in punched-out portions 14 of the material, such portions acting as spacers when abutting the other plate. The other plate is provided with threaded holes 15, located to respectively aline with the aforesaid apertures, whereby fastening screws 16 hold the parts together while the portions 14 provide the space for the required relative movement of the sensing member 12. Also, the two plates 10 and 11 together form the twin base of the utensil and have surface contacting feet 17 with straight edge-supporting faces to seat on the same plane surface 18 as that which supports the meat being measured.

The reference plate 10 is formed with a straight index edge 19 radially disposed with the pivot 13 as a center, and the plate 11 is likewise formed with a straight index edge 20, also radially disposed with the pivot 13 as a center. The two edges 19 and 20, in assembled condition, are in transverse alinement and each has a row of index marks 21' and 22' respectively suitably spaced for a purpose to be presently described. The upper edge portion of each plate 10 and 11 is preferably in the form of an arc.

The sensing member 12 has a body portion riding between the two reference plates and has an arcuate extension with side edges converging to terminate in a sensing finger 23' for contact with the meat to be measured. The range of measuring swing of the finger 23' is from a contact position against the surface 18 to a maximum spacing sufficient to straddle all ordinary thicknesses of domestic meats. One side of the body of the sensing member 12 is provided with a plurality of arcuate cooking time scales 24 generated about the pivot 13, each scale having a zero position to aline with the index edge 19 when the finger 23' is in contact with the surface 18. From such zero position the scale is laid off in time indicia such as hours and fractions thereof. When in the aforesaid zero position all of these time indicia are concealed by the adjacent reference plate 10, and are brought into viewing position as the sensing finger 23' is swung to a measuring position. Thus, when measuring a meat thickness of approximately one and one half inches, a radial row of time indicia will be alined with the index edge 19, each indicia showing the cooking time for a particular kind of meat.

For selecting the kind of meat for association with the time scale, the exposed face of the reference plate 10 is provided with legends in the form of concentric rows identifying different kinds of meat and with each row having indicia corresponding to the correct cooking temperature for the particular meat. For example, the legend for beef and venison reads 325°, with index marks 21' respectively opposite "Well Done," "Medium" and "Rare." Thus, with the sensing finger 23' set as shown in Fig. 1 and measuring a piece of a beef A, three different times can be read by the respective registrations of the index marks with the three cooking time scales on the body of the sensing member, such reading being one hour for well done and successively less time indicated for medium and rare. In the same way legends for fowl and fish with respective temperatures are used.

In order to provide a wider range of meats than could be conveniently itemized on the parts of the utensil, the opposite side of the sensing member 12 is provided with arcuate rows of time scales, reverse in direction to those on the other side, so that the zero row alines with the index edge 20 on the reference plate 11. In this instance, different meat legends are provided on the plate face in the form of concentric rows and with the cooking temperature respectively for the meat in such rows. The foregoing scales, indicia and legends are shown in Fig. 2, and the operation of the utensil is the same as that described for Fig. 1. Thus, if the meat to be measured is not on one side of one plate, the utensil is reversed to find it on the other side. It should be noted that the index edges 19 and 20 with the respective index marks registering with the time scale, provide a very accurate means for reading the cooking time as a function of meat thickness.

It will now be apparent that a novel unitary timing utensil for food products, such as meat, has been devised, whereby the baking time for any selected meat can be accurately determined prior to starting the actual cooking. The utensil is arranged to take care of a wide variety of meats, including that of domestic animals, wild animals, ordinary fowl, game fowl, as well as fish, fish roe, and edible parts of animals, such, for example, as hearts, brains, and liver.

Having thus described my invention, I claim:

A cooking utensil comprising two relatively thin L-shaped reference plates, each having a wide base part with a straight edge for seating on a support and a narrow part forming an index edge, means fastening said plates together in spaced relation with said index edges in alinement, a pivot between said plates, a sensing member mounted on said pivot having an elongated laterally disposed sensing finger for contacting meat on said support, the outer exposed face of each of said plates having legends identifying different kinds of meat and cooking temperatures therefor, said sensing member having radially arranged concentric cooking time scales on opposite faces thereof for sequential exposure as said sensing member moves relative to said plates in making a meat measurement, said scales respectively having a registering relation with said meat legends, said index edges being sensibly radial with respect to said pivot, and gauge index marks along each edge for registration with said cooking time scales.

References Cited in the file of this patent

UNITED STATES PATENTS

| | | |
|---|---|---|
| 579,573 | Goff | Mar. 30, 1897 |
| 583,695 | Stalons et al. | June 1, 1897 |
| 901,678 | Brayton | Oct. 20, 1908 |
| 2,362,907 | Levin | Nov. 14, 1944 |
| 2,435,606 | Sadowsky | Feb. 10, 1948 |
| 2,435,644 | Beckett et al. | Feb. 10, 1948 |
| 2,591,504 | Botts | Apr. 1, 1952 |
| 2,603,872 | Jones | July 22, 1952 |

FOREIGN PATENTS

| | | |
|---|---|---|
| 1,853 | Great Britain | May 9, 1879 |